United States Patent [19]
Collins et al.

[11] Patent Number: 4,799,306
[45] Date of Patent: Jan. 24, 1989

[54] METHOD OF SECURING HANDLES TO PLASTICS CONTAINERS

[75] Inventors: Malcolm G. Collins, Oxforshire; Christopher S. Parry, Hertfordshire, both of England

[73] Assignee: Metal Box plc, United Kingdom

[21] Appl. No.: 196,154

[22] Filed: May 19, 1988

[30] Foreign Application Priority Data

Jun. 16, 1987 [GB] United Kingdom ............... 8713968

[51] Int. Cl.$^4$ ............................................. B23P 11/02
[52] U.S. Cl. ........................................ 29/453; 29/515; 29/525; 16/111 R; 16/DIG. 24; 220/94 R
[58] Field of Search ................. 29/515, 520, 525, 453; 150/107; 190/115, 116; 220/94 R; 403/381, 375, 405.1, 71, 122; 16/114 R, 111 R, DIG. 24

[56] References Cited
U.S. PATENT DOCUMENTS 1,694,165 12/1928 Debacher ........................ 220/94 R
4,507,821 4/1985 Jorgenaen ................. 16/DIG. 24 X Primary Examiner—Timothy V. Eley
Assistant Examiner—Peter D. B. Vo
Attorney, Agent, or Firm—Diller, Ramik & Wight

[57] ABSTRACT

A plastics strap handle is secured to a plastics container body by means of a spigot which is pushed into the wall of the container body to form a socket. Material from the wall around the socket is coined into an annulus surrounding the shank of the spigot to retain the head of the spigot in the socket.

6 Claims, 4 Drawing Sheets

METHOD OF SECURING HANDLES TO PLASTICS CONTAINERS

BACKGROUND OF THE INVENTION

1. Field of the Invention

The invention relates to the field of securing a strap handle to a preformed plastics container body.

Large plastics containers such as paint cans are generally provided with a wire or strap handle made of steel or plastics; this handle being usually retained on the container body by rivets or lugs moulded integrally with the container body and projecting outwardly thereof. Such outward projections from an otherwise uninterrupted surface cause difficulties in the high speed decoration of the containers and hence moves have been made to introduce alternative means of retaining the handles using inwardly projecting sockets on the container body and matching projections on the ends of the handle.

2. Description of Related Art

The sockets may be moulded as an integral part of the container, but this necessitates the use of collapsible core moulds which are complicated, expensive, and prone to operational problems.

In a method and apparatus described in European Patent Application 0207764 the sockets are cold-formed using standard tooling after the decoration of the container has been accomplished, and oversized projections on the two ends of the plastic handle are forced into the sockets using an appropriate handle assembly machine.

The disadvantages of this prior method lie in its being a two-stage process and in the accuracy of the positional alignment required on the second machine by which the handle projections are located against the mouths of the sockets and forced into them.

SUMMARY

The object of the present invention is to utilize the well known cold-forming (coining) characteristics of resilient thermoplastic materials such as polypropylene, to effect the securing of a plastics or metal strap handle to the wall of a container body in one operation. According to the present invention there is provided a method of securing a handle to a preformed plastics container body, wherein the handle is in the form of an elongate strap having a lateral projection at at least one end thereof in the form of a spigot having a head portion at its free end and a shank connecting the head portion to the strap; the diameter of the shank being less than the diameter of the head portion, the method comprising the steps of:

(a) locally supporting the wall of the container body on the inside by means of a female die having a recess of diameter greater than that of the head portion of the spigot and opening against the wall of the container body;

(b) pushing the spigot into the die from the outside of the container body such that material from the container body wall is plastically deformed into the recess of the die around the spigot head portion to form a socket; and (c) squeezing the wall of the container body in the region of the socket such that material from the wall of the container body is plastically deformed into the annulus surrounding the shank of the spigot to retain the head portion of the spigot in the socket.

DESCRIPTION OF THE PREFERRED EMBODIMENTS

Figure 1A:
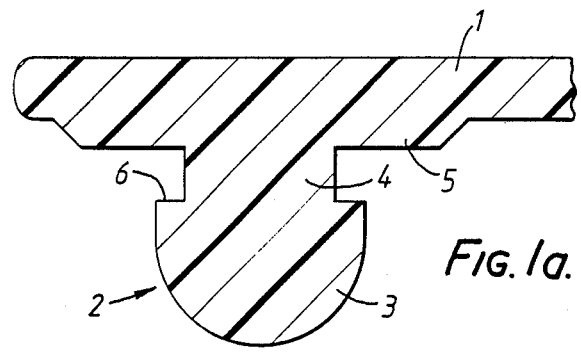
FIGS. 1a and 1b show the end of a plastics strap handle having a projection in the form of a spigot formed thereon.

In FIG. 1a the end of a handle 1 in the form of an elongate moulded polypropylene strap is shown having a spigot 2 projecting laterally therefrom. The spigot has a rounded head portion 3 at its free end, a base portion 5 connected to the strap and forming a platform raised from the web of the strap, and a cylindrical shank 4 connecting the head portion 3 to the base portion 5. As can be seen from the drawing, the diameter of the shank 4 is less than the diameter of the head portion 3 and the diameter of the base portion 5 is greater than the diameter of the head portion 3. An annular step 6 is formed at the junction between the shank 4 and the head portion 3.

Figure 1B:
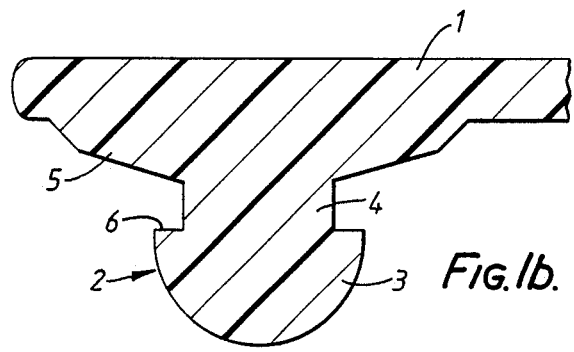

FIG. 1b shows an alternative embodiment of the handle end shown in FIG. 1a in which the face of the base portion directed towards the head portion is inclined at an angle of approximately 30°. This construction of the spigot has been found to be more efficient in plastically deforming material from the container wall into the annulus surrounding the shank 4.

Figure 2:
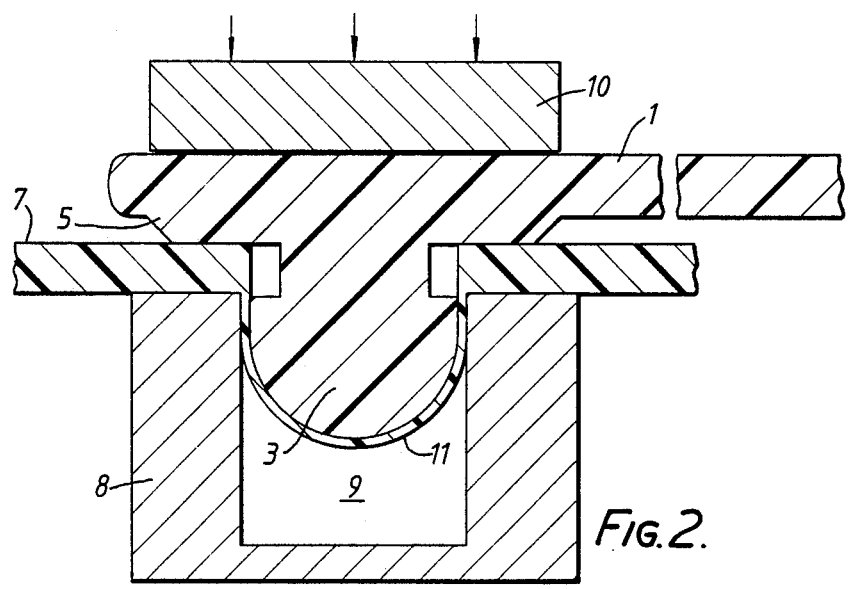
FIG. 2 shows a cross-section through one end of a plastics strap handle at a first stage of the operation in which it is secured to the side wall of a container body.
Figure 3:
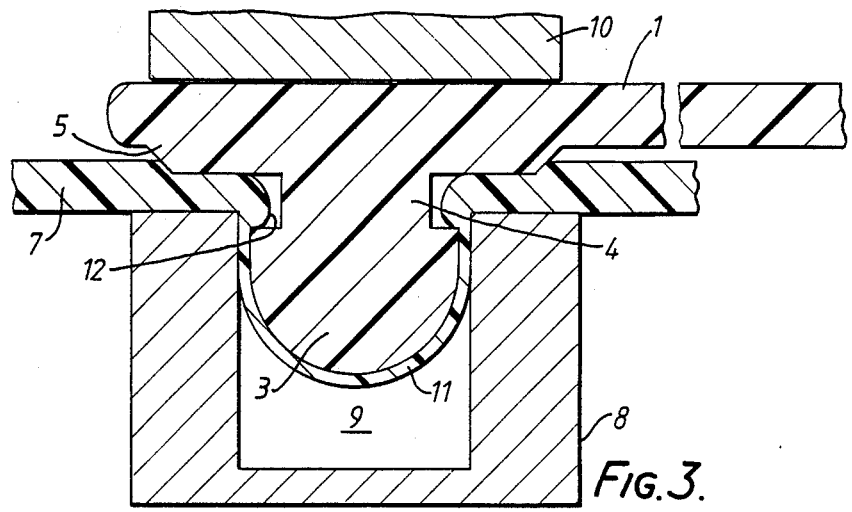
FIG. 3 shows a cross-section through the plastics handle at a second stage of the operation in which it is secured to the side wall of a container body.

The operation of securing the handle to the body of a container (also moulded from polypropylene) is shown in FIGS. 2 and 3. The side wall 7 of the container body is locally supported on the inside thereof by a female die 8. The die 8 has a cylindrical recess 9 formed therein of diameter slightly greater than the diameter of the head portion 3 of the spigot projection. A hammer 10 forces the spigot projection into the recess 9 from the outside of the container such that material from the container wall 7 is plastically deformed into the cylindrical recess 9 around the spigot head portion to form a socket 11. Further movement of the hammer beyond the position shown in FIG. 2 into the position shown in FIG. 3 causes the side wall of the container to be squeezed between the base 5 of the spigot and the supporting die 8. As shown in FIG. 3 this causes material from the side wall 7 to be plastically deformed into the annulus 12 surrounding the shank 4 to retain the spigot head portion 3 in the socket 11.

In an example, the container body is moulded from polypropylene (although other resilient thermoplastic materials may be used) and has a wall thickness of about 1.5 mm. Using a spigot having a hemispherical head portion of diameter 7 mm and a die having a recess 9 of diameter 8 mm and adequately robust socket of wall thickness about 0.3 mm can be formed. A force of between 5,000 and 10,000 Newtons is required to be applied between the hammer 10 and the die 8 to effect deformation of material into the annulus surrounding the shank 4. In order to improve the strength of the handle attachment it may be required to increase the diameter of the head portion of the spigot to about 9 mm so that the shank has a diameter of about 7 mm. In this case the diameter of the recess 9 will be about 10 mm.

Figure 4:
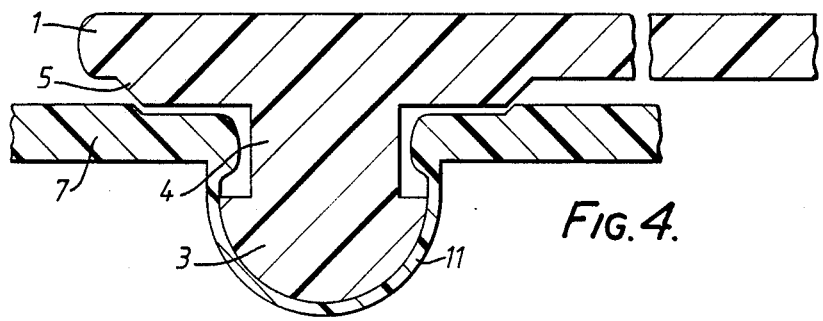
FIG. 4 shows a cross-section of the end of a strap handle secured to the side wall of a container body and having an alternative construction of projection.

In an alternative embodiment shown in FIG. 4 the shank 4 is of extended length and the head portion is reduced. As can be seen from FIG. 4, some elastic recovery of the socket takes place when the pressure of the hammer is removed. In the case of the embodiment shown in FIG. 3 this recovery serves to hold the step 6 on the spigot tightly against the material coined into the annulus 12, whereas in the case of the FIG. 4 embodiment some degree of translational movement of the spigot will be possible even after elastic recovery has taken place and this will facilitate removal of the spigot projection from the socket if required. A spigot projection formed in this way can be re-secured to the container body wall by snap-fitting into the socket 11.

Figure 5:
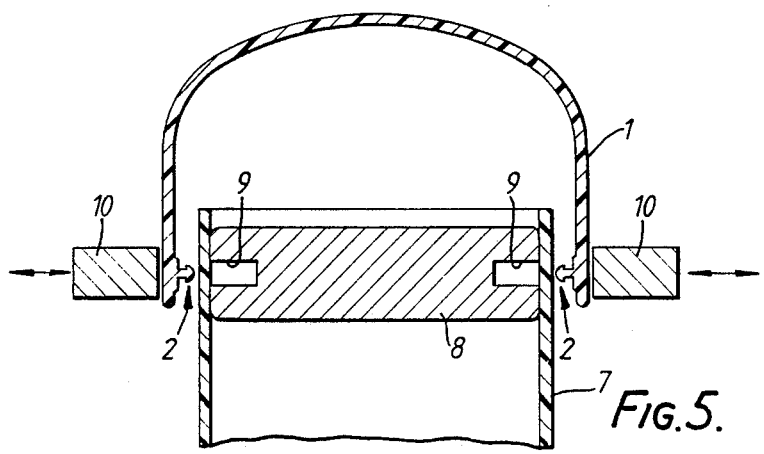
FIG. 5 shows a schematic representation of the tooling used to effect securing of the handle to the container body wall.

Apparatus for securing both ends of a strap handle to a container body wall is shown diagrammatically in FIG. 5 in which a single die tool 8 having cylindrical recesses 9 at either end is shown and co-operates with coaxially aligned hammers 10 which may be pneumatically or mechanically operated.

Figure 6:
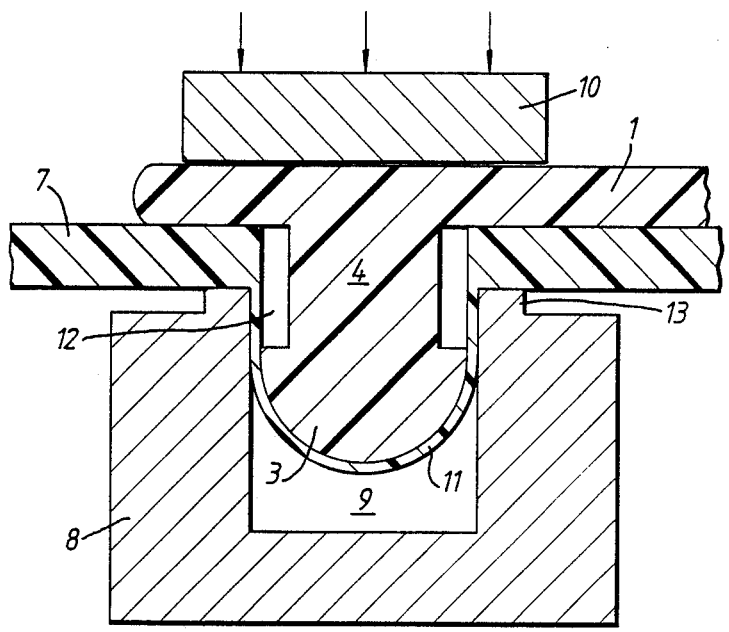
FIG. 6 shows a modified construction of handle projection being secured by means of modified tooling.

FIG. 6 shows an alternative construction of handle and method of securing wherein the base 5 of the spigot projection may be omitted. In this case, coining of the body wall of the container around the socket is effected by means of a profile formed on the end of the die 8. In the embodiment shown the profile is provided by an annular ridge 13 formed on the die 8 surrounding the mouth of the recess 9. When the handle is secured to the container body wall 7 the ridge 13 is forced into the wall and causes material therefrom to be deformed plastically into the annulus 12 surrounding the shank 4. As an example, for a polypropylene container body having a wall thickness of 1.5 mm and a polypropylene handle having a spigot head portion of 7 mm diameter, the die recess 9 may have a diameter of 8 mm and the annular ridge 13 may be 2 mm wide and 1.5 mm high. If the shank of the spigot is about 3 mm in length a load of only 5,000 to 7,500 Newtons is required to effect satisfactory coining of material into the annulus around the shank.

Figure 7:
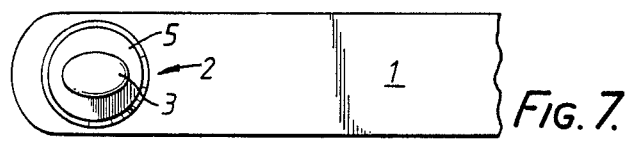
FIG. 7 shows a further modified form of handle projection.
Figure 8:
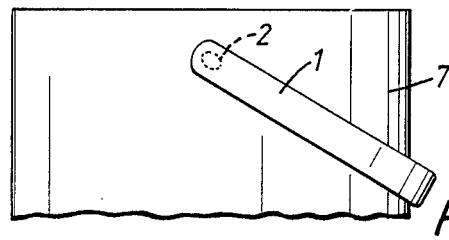
FIG. 8 shows a side view of a container body with a handle of FIG. 7 secured thereon and held in a downward position.
Figure 9:
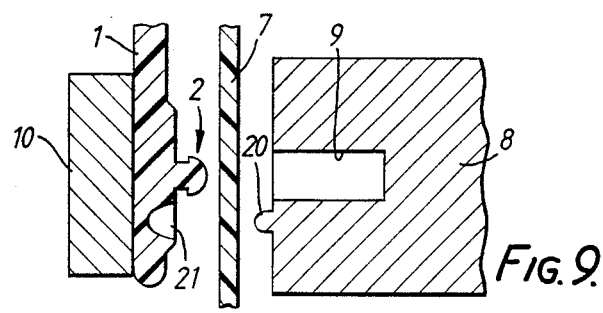
FIG. 9 shows an alternative embodiment of the end of a handle and tooling for fitting the handle to a container body wall.
Figure 10:
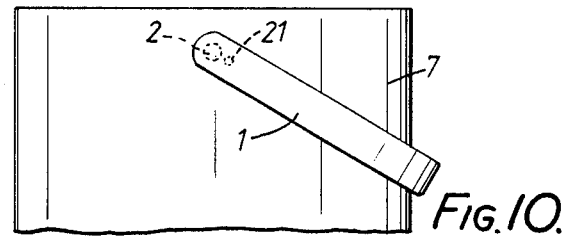
FIG. 10 shows a side view of a container body having a handle according to FIG. 9 secured thereto and held in a downward position.

FIG. 7 shows an alternative construction of the handle and spigot projection which ensures that the handle can be held reliably in a downward orientation. This is important to the commercial exploitation of handled containers where random orientation of the handles on the containers can give rise to difficulties on the equipment for filling the containers. As shown in FIG. 7 the head portion of the spigot projection is slightly oval rather than circular. The effect of using such a projection in conjunction with a correspondingly shaped die tool, is to form a slightly oval socket which resists rotation of the handle away from the position in which the socket is formed. Hence if the deformation is effected with the handle in the required downward position, as shown in FIG. 8, a slight effort is required to raise the handle, although this is possible due to the elasticity of the socket. An alternative method of providing the hold down feature is shown in FIGS. 9 and 10 in which the die 8 is provided with a projecting pip 20 at its end engaging the inside wall of the container body. A corresponding depression 21 is provided in the strap handle. When the socket is formed by forcing the spigot projection into the die 8 the pip 20 simultaneously forces material from the container body wall into the depression 21 to form a bump on the outside of the container body wall. As shown in FIG. 10, this bump cooperates with the recess 21 to releasably retain the handle in a downward orientation.

Figure 11:
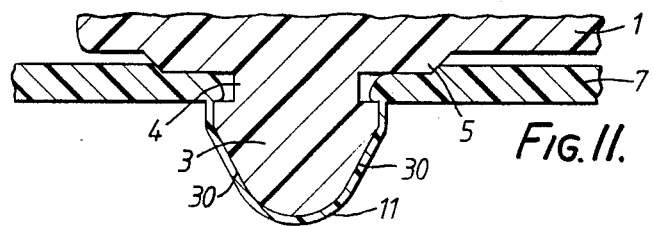
FIG. 11 shows a section through a yet further modified form of handle projection.

In a further modification of the spigot, shown in FIG. 11, the head portion is of generally hemispherical form but has one or more flat surfaces 30 provided thereon. The flat surfaces help to hold the handle in the downward position in which the socket is formed, but permit the use of a circular die 8.

We claim:

1. A method of securing a handle to a preformed plastics container body, wherein the handle is in the form of an elongate strap having a lateral projection at at least one end thereof in the form of a spigot having a head portion at its free end and a shank connecting the head portion to the strap; the diameter of the shank being less than the diameter of the head portion, the method comprising the steps of:
   (a) locally supporting the wall of the container body on the inside by means of a female die having a recess of diameter greater than that of the head portion of the spigot and opening against the wall of the container body;
   (b) pushing the spigot into the die from the outside of the container body such that material from the container body wall is plastically deformed into the recess of the die around the spigot head portion to form a socket; and
   (c) squeezing the wall of the container body in the region of the socket such that material from the wall of the container body is plastically deformed into the annulus surrounding the shank of the spigot to retain the head portion of the spigot in the socket.

2. A method of securing a handle to a preformed plastics container body comprising the steps of:
   (a) forming an elongate handle strap having a lateral projection at at least one end thereof in the form of a spigot having a rounded head portion at its free end, a base portion connected to the strap, and a shank connecting the head portion to the base portion, wherein the diameter of the shank is less than that of the head portion and the diameter of the base portion is greater than that of the head portion;
   (b) locally supporting a wall of the container body on the inside by means of a female die having a recess of diameter greater than that of the head portion but less than that of the base portion of the spigot and opening against the wall of the container (c) pushing the spigot into the die from the outside of the container body such that material from the container body wall is plastically deformed into the recess of the die around the spigot head portion to form a socket; and (d) squeezing the wall of the container between the base of the spigot and the die such that material from the wall of the container is plastically deformed into the annulus surrounding the shank of the spigot to retain the head portion of the spigot in the socket.

3. A method as claimed in claim 1 wherein the plastic deformation of material into the annulus surrounding the shank of the spigot is effected by providing the end of the die surrounding the recess with a ridged profile.

4. A method as claimed in claim 1 wherein the handle is provided with a lateral projection at each end thereof and wherein the projections are simultaneously pushed into the wall of the container body at two opposite regions thereof supported by the ends of a single die.

5. A method as claimed in claim 2 wherein the handle is provided with a lateral projection at each end thereof and wherein the projections are simultaneously pushed into the wall of the container body at two opposite regions thereof supported by the ends of a single die.

6. A method as claimed in claim 3 wherein the handle is provided with a lateral projection at each end thereof and wherein the projections are simultaneously pushed into the wall of the container body at two opposite regions thereof supported by the ends of a single die.

* * * * *